US009019396B2

(12) United States Patent
Kiyoshige et al.

(10) Patent No.: US 9,019,396 B2
(45) Date of Patent: Apr. 28, 2015

(54) WIRELESS COMMUNICATION DEVICE, MEMORY DEVICE, WIRELESS COMMUNICATION SYSTEM, WIRELESS COMMUNICATION METHOD, AND PROGRAM RECORDABLE MEDIUM

(71) Applicant: Olympus Corporation, Tokyo (JP)

(72) Inventors: Ryuichi Kiyoshige, Tokyo (JP); Akihiko Sakamoto, Sagamihara (JP)

(73) Assignee: Olympus Corporation, Tokyo (JP)

( * ) Notice: Subject to any disclaimer, the term of this patent is extended or adjusted under 35 U.S.C. 154(b) by 234 days.

(21) Appl. No.: 13/864,711

(22) Filed: Apr. 17, 2013

(65) Prior Publication Data

US 2013/0278795 A1  Oct. 24, 2013

(30) Foreign Application Priority Data

Apr. 19, 2012  (JP) ................................. 2012-095841

(51) Int. Cl.
*H04N 5/76*   (2006.01)
*H04N 5/262*  (2006.01)
*H04N 5/232*  (2006.01)
*H04N 5/77*   (2006.01)
*H04N 5/907*  (2006.01)
*H04N 9/82*   (2006.01)

(52) U.S. Cl.
CPC ........... *H04N 5/262* (2013.01); *H04N 5/23206* (2013.01); *H04N 5/772* (2013.01); *H04N 5/907* (2013.01); *H04N 9/8205* (2013.01)

(58) Field of Classification Search
CPC ......... H04N 5/77; H04N 5/765; H04N 5/772; H04N 5/775; H04N 1/0095; H04N 5/23206; H04N 5/262; H04N 9/8205
See application file for complete search history.

(56) References Cited

U.S. PATENT DOCUMENTS 7,746,388 B2 *  6/2010  Jeon ........................... 348/231.2
8,229,157 B2 *  7/2012  Hayashi ........................ 382/100
2012/0088523 A1 *  4/2012  Shirakawa et al. ........ 455/456.3

FOREIGN PATENT DOCUMENTS

JP        2004-125490 A     4/2004

* cited by examiner

*Primary Examiner* — Paul Berardesca
(74) *Attorney, Agent, or Firm* — Westerman, Hattori, Daniels & Adrian, LLP

(57) ABSTRACT

A wireless communication device, a memory device, a wireless communication system, a wireless communication method, and a program recordable medium are possible to attach positional information to image data without changing a hardware configuration of a device such as a digital camera capable of outputting image data. A memory I/F unit receives the image data to which positional information is attached from another device. A memory unit stores the image data input to the memory I/F unit. A storage data analyzing unit extracts the positional information from the image data when image data is stored in the memory unit. A system control unit causes the extracted positional information to be wirelessly transmitted from an RF unit to another wireless communication device.

15 Claims, 11 Drawing Sheets

WIRELESS COMMUNICATION DEVICE, MEMORY DEVICE, WIRELESS COMMUNICATION SYSTEM, WIRELESS COMMUNICATION METHOD, AND PROGRAM RECORDABLE MEDIUM

BACKGROUND OF THE INVENTION

1. Field of the Invention

The present invention relates to a technique of acquiring positional information to be attached to image data.

This application claims priority to and the benefit of Japanese Patent Application No. 2012-095841 filed on Apr. 19, 2012, the disclosure of which is incorporated by reference herein.

2. Description of Related Art

In recent years, mobile devices with GPS receivers have increasingly come on the market. Applications or services that allow users to easily acquire current positional information, attach the current positional information to a photograph, and arrange the photograph on an electronic map or inform friends of the current position have been developed.

As a method of attaching positional information to a photograph, for example, there is a method of installing a GPS module in a digital camera. As an alternative method, a GPS receiver called a GPS logger is prepared, a device capable of recording history of GPS positional information acquired by the GPS logger is used when a photograph is taken, and after taking the photograph, at home, the positional information is attached to the photograph while comparing a photographing time of the photograph with history of the GPS positional information acquired by the GPS logger using a dedicated application on a personal computer.

Meanwhile, when it is desired to record positional information in photographs taken when going sightseeing with family or friends, any one person may have a GPS-equipped digital camera. However, it is hard for all people to bring a GPS-equipped digital camera. Further, the GPS logger is necessarily used on the personal computer, and thus postprocessing for attaching positional information to a photograph is very bothersome, and is a burden on the user.

As a method of recording positional information in a photograph in a device that is unable to directly acquire positional information, a technique of performing communication for inquiring about whether or not a terminal with a near field communication (NFC) function is nearby, requesting a terminal that has responded to transmit positional information, and receiving the positional information from the corresponding terminal is disclosed in Japanese Unexamined Patent Application, First Publication. No. 2004-125490.

SUMMARY OF THE INVENTION

According a first aspect of the present invention, provided is a wireless communication device which includes a wired interface that receives image data to which positional information is attached from another device, a wireless communication interface, a storage unit that stores the image data input to the wired interface, and a control unit that extracts the positional information from the image data when the image data is stored in the storage unit, and causes the extracted positional information to be wirelessly transmitted from the wireless communication interface to another wireless communication device.

According a second aspect of the present invention, in the wireless communication device according to the first aspect, time information is further attached to the image data, and the control unit extracts the positional information and the time information from the image data when the image data is stored in the storage unit, and causes the extracted positional information and the time information to be wirelessly transmitted from the wireless communication interface.

According a third aspect of the present invention, in the wireless communication device according to the first aspect, the control unit suppresses a signal output level of the wireless communication interface when the positional information is wirelessly transmitted from the wireless communication interface.

According a fourth aspect of the present invention, in the wireless communication device according to the first aspect, the control unit further causes the positional information to be wirelessly transmitted from the wireless communication interface when the wireless communication interface receives a positional information acquisition request wirelessly transmitted from another wireless communication device.

According a fifth aspect of the present invention, in the wireless communication device according to the first aspect, time information is further attached to the image data. In addition, when the wireless communication interface receives a positional information acquisition request including the time information wirelessly transmitted from another wireless communication device, the control unit further selects the image data based on the received time information and the time information attached to the image data stored in the storage unit, and causes the positional information attached to the selected image data to be wirelessly transmitted from the wireless communication interface.

According a sixth aspect of the present invention, provided is a wireless communication device which includes a wired interface that receives image data from another device, a wireless communication interface that extracts the positional information from the image data when the image data to which the positional information is attached is stored, and wirelessly receives the positional information from another wireless communication device that wirelessly transmits the extracted positional information, a storage unit that stores the positional information received by the wireless communication interface and the image data input to the wired interface, and a control unit that attaches one of positional information stored in the storage unit to the image data stored in the storage unit when the image data is stored in the storage unit.

According a seventh aspect of the present invention, in the wireless communication device according to the sixth aspect, when image data to which positional information and time information are attached is stored, the wireless communication interface extracts the positional information and the time information from the image data, and wirelessly receives the positional information and the time information from another wireless communication device that wirelessly transmits the extracted positional information and the time information, the storage unit further stores the time information received by the wireless communication interface, and when the image data is stored in the storage unit, the control unit selects one of positional information stored in the storage unit based on the time information attached to the image data stored in the storage unit and the time information received by the wireless communication interface and stored in the storage unit, and attaches the selected positional information to the image data stored in the storage unit.

According an eighth aspect of the present invention, in the wireless communication device according to the sixth aspect, the control unit further causes a positional information acquisition request to be wirelessly transmitted from the wireless communication interface to the another wireless communication device. After wirelessly transmitting the acquisition request, the wireless communication interface further wirelessly receives the positional information wirelessly received from the another wireless communication device that has wirelessly transmitted the acquisition request. When the positional information is wirelessly received, the control unit further attaches the wirelessly received positional information to the image data stored in the storage unit.

According a ninth aspect of the present invention, in the wireless communication device according to the sixth aspect, time information is attached to the image data. When the positional information acquisition request is wirelessly transmitted from the wireless communication interface, the control unit causes the time information attached to the image data stored in the storage unit to be wirelessly transmitted to the other wireless communication device.

According a tenth aspect of the present invention, provided is the wireless communication device according to the first or sixth aspect.

According an eleventh aspect of the present invention, provided is a wireless communication system which includes a first wireless communication device and a second wireless communication device. The first wireless communication device includes a first wired interface that receives image data to which positional information is attached from another device, a first wireless communication interface, a first storage unit that stores the image data input to the first wired interface, and a first control unit that extracts the positional information from the image data when the image data is stored in the first storage unit, and causes the extracted positional information to be wirelessly transmitted from the first wireless communication interface to the another wireless communication device. The second wireless communication device includes a second wired interface that receives image data from another device, a second wireless communication interface that wirelessly receives the positional information from the first wireless communication device, a second storage unit that stores the positional information received by the second wireless communication interface and the image data input to the second wired interface, and a second control unit that attaches one of positional information stored in the second storage unit to the image data stored in the second storage unit when the image data is stored in the second storage unit.

According a twelfth aspect of the present invention, provided is a wireless communication method which includes inputting image data to which positional information is attached from another device to a wired interface, storing the image data input to the wired interface in a storage unit, and extracting the positional information from the image data when the image data is stored in the storage unit to cause the extracted positional information to be wirelessly transmitted from the wireless communication interface to another wireless communication device.

According a thirteenth aspect of the present invention, provided is a wireless communication method which includes inputting image data from another device to a wired interface, extracting the positional information from the image data when the image data to which the positional information is attached is stored to wirelessly receive the positional information from another wireless communication device that wirelessly transmits the extracted positional information through a wireless communication interface, storing the positional information received by the wireless communication interface and the image data input to the wired interface in a storage unit, and attaching one of positional information stored in the storage unit to the image data stored in the storage unit when the image data is stored in the storage unit.

According a fourteenth aspect of the present invention, provided is a program recordable medium recording a program causing a computer of a wireless communication device including a wired interface, a wireless communication interface, and a storage unit to execute: inputting image data to which positional information is attached from another device to the wired interface, storing the image data input to the wired interface in the storage unit, and extracting the positional information from the image data when the image data is stored in the storage unit to cause the extracted positional information to be wirelessly transmitted from the wireless communication interface to another wireless communication device.

According a fifteenth aspect of the present invention, provided is a program recordable medium recording a program causing a computer of a wireless communication device including a wired interface, a wireless communication interface, and a storage unit to execute: inputting image data from another device to the wired interface, extracting the positional information from the image data when the image data to which the positional information is attached is stored to wirelessly receive the positional information from another wireless communication device that wirelessly transmits the extracted positional information through the wireless communication interface, storing the positional information received by the wireless communication interface and the image data input to the wired interface in the storage unit, and attaching one of positional information stored in the storage unit to the image data stored in the storage unit when the image data is stored in the storage unit.

DETAILED DESCRIPTION OF THE INVENTION

Hereinafter, exemplary embodiments of the present invention will be described with reference to the accompanying drawings.

(Overview of Embodiment)

Figure 1:
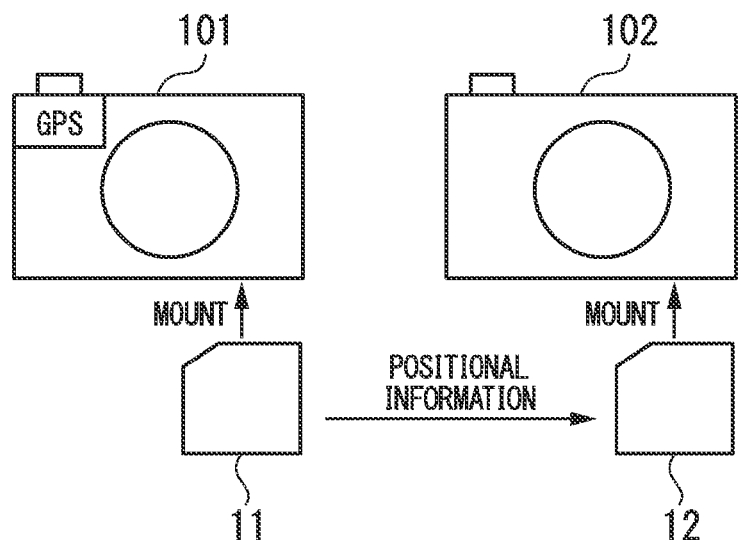
FIG. 1 is a diagram illustrating an overall configuration of an embodiment of the present invention.

FIG. 1 illustrates an overall configuration of an embodiment of the present invention. There are a digital camera 101 having a GPS reception function and a digital camera 102 having no GPS reception function. A memory card 11 with a wireless communication function is mounted in the digital camera 101, and a memory card 12 with a wireless communication function is similarly mounted in the digital camera 102.

The memory card 11 is able to perform wireless communication with the memory card 12 through the wireless communication function, and the digital camera 101 transmits positional information acquired by the GPS reception function from the memory card 11 to the memory card 12. The memory card 11 and the memory card 12 configure a wireless communication system for sharing positional information.

Figure 2:
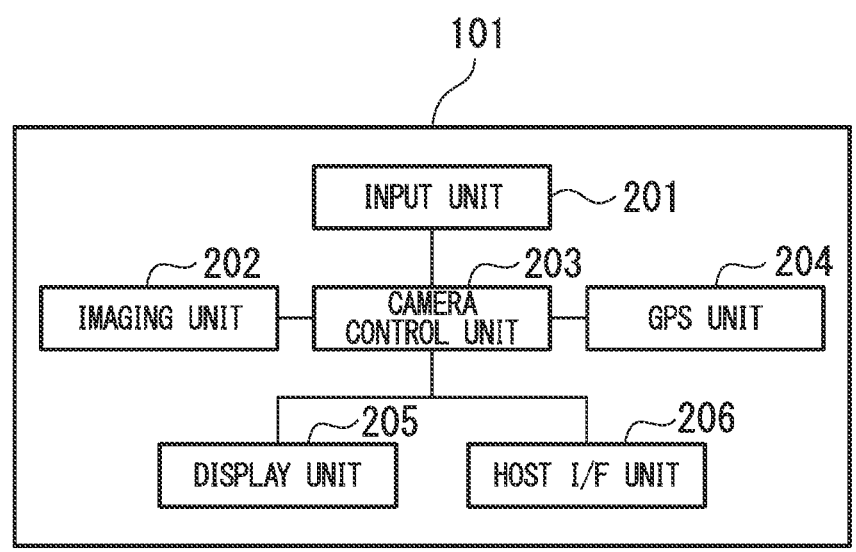
FIG. 2 is a block diagram illustrating a configuration of a digital camera according to an embodiment of the present invention.

FIG. 2 illustrates a configuration of a digital camera according to an embodiment. The digital camera 101 has the same configuration as the digital camera 102, and thus the description will proceed with the configuration of the digital camera 101.

The digital camera 101 includes an input unit 201, an imaging unit 202, a camera control unit 203, a GPS unit 204, a display unit 205, and a host interface (I/F) unit 206. The input unit 201 receives an input of a photographing instruction or the like from the user. The imaging unit 202 takes a photograph of a subject, and generates image data (photograph data). The camera control unit 203 controls internal processing of the digital camera 101. The GPS unit 204 receives GPS information from a GPS satellite, and calculates current positional information of the digital camera. The display unit 205 displays a live view video at the time of photographing, a still image of a photographing result, a menu prompting the user to make an input, or the like. The host I/F unit 206 is a communication interface through which communication with a memory card recording image data is performed.

Figure 3:
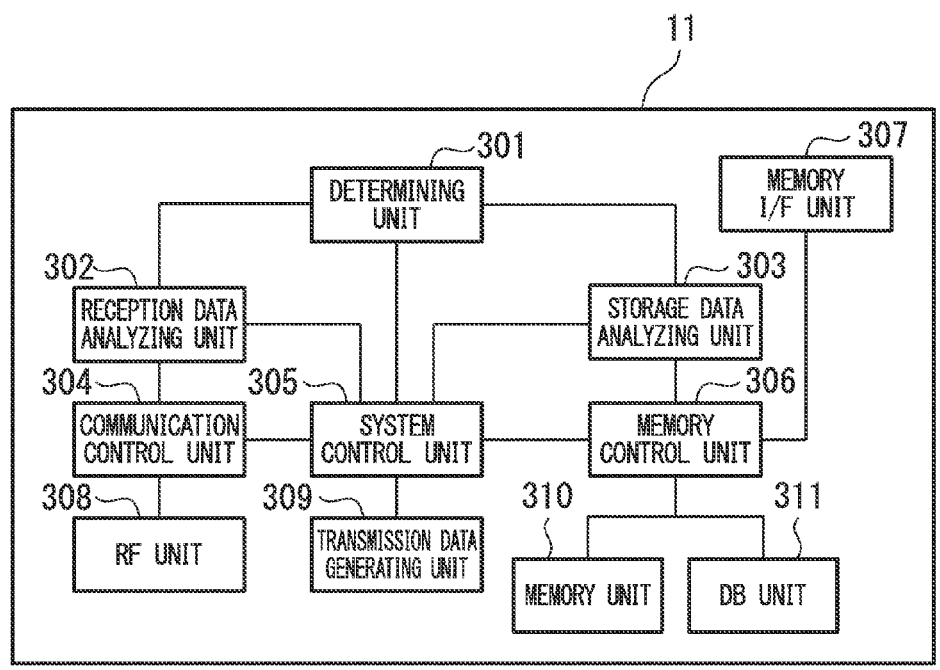
FIG. 3 is a block diagram illustrating a configuration of a memory card according to an embodiment of the present invention.

FIG. 3 illustrates a configuration of a memory card according to an embodiment. The memory card 11 has the same configuration as the memory card 12, and thus the description will proceed with the configuration of the memory card 11.

The memory card 11 includes a determining unit 301, a reception data analyzing unit 302, a storage data analyzing unit 303, a communication control unit 304, a system control unit 305, a memory control unit 306, a memory I/F unit 307, a RF unit 308, a transmission data generating unit 309, a memory unit 310, and a database (DB) unit 311.

The reception data analyzing unit 302 analyzes data received through the RF unit 308 and extracts necessary information. The storage data analyzing unit 303 analyzes image data stored in the memory unit 310 and extracts necessary information. The determining unit 301 compares the information obtained from the reception data analyzing unit 302 with the information obtained from the storage data analyzing unit 303, and determines whether or not positional information is to be attached to the image data stored in the memory unit 310.

The communication control unit 304 performs communication control of the RF unit 308. The memory control unit 306 controls storage of data in the memory unit 310 and the DB unit 311 and reading of data from the memory unit 310 and the DB unit 311. The memory I/F unit 307 is a wired interface which is connected with the host I/F unit 206 of the digital camera 101 in a wired manner to perform data communication and receives image data from the digital camera 101. The RF unit 308 is a wireless communication interface through which wireless communication is performed. The transmission data generating unit 309 generates transmission data to be transmitted through the RF unit 308. The memory unit 310 reads and stores image data. The DB unit 311 stores positional information in association with time information, and stores conditions for attaching positional information to image data or various kinds of setting values in the memory card. The system control unit 305 controls the entire system of the memory cards 11 and 12.

The memory I/F unit 307 corresponds to a wired interface according to the present invention. The communication control unit 304 and the RF unit 308 correspond to a wireless communication interface according to the present invention. The memory unit 310 and the DB unit 311 correspond to a storage unit according to the present invention. The determining unit 301, the reception data analyzing unit 302, the storage data analyzing unit 303, and the system control unit 305 correspond to a control unit according to the present invention.

A program for implementing operations and functions of the memory cards 11 and 12 is recorded in a computer readable recording medium (the memory unit 310). By causing the system control units 305 which are computers of the memory cards 11 and 12 to read and execute the program recorded in the recording medium, the functions of the memory cards 11 and 12 are implemented.

Examples of the "computer readable recording medium" include a portable medium such as a flexible disk, a magnetic optical disc, a ROM, a CD-ROM, a DVD-ROM, or a flash memory and a storage device such as a hard disk built in a computer. Examples of the "computer readable recording medium" further include a medium that stores the program during a predetermined period of time such as a volatile memory (RAM) in a computer system serving as a server or a client when the program is transmitted via a network such as the Internet or a communication line such as a telephone line.

The program may be transmitted from a computer that stores the program in a storage device or the like to another computer through a transmission medium or a transmission wave in a transmission medium. Here, the "transmission medium" for transmitting the program refers to a medium having a function of transmitting information such as a network (a communication network) including the Internet or a communication circuit (a communication line) including a telephone line. The program may be used to implement some of the above-described functions. In addition, the above-described functions can be implemented in combination with a program recorded in a computer in advance, and thus the program may be a differential file (a differential program).

(First Embodiment)

First of all, a first embodiment of the present invention will be described. The first embodiment will be described in connection with a method of sharing positional information such that the memory card 11 delivers GPS positional information acquired by the digital camera 101.

(Transmission Side Process)

Figure 4:
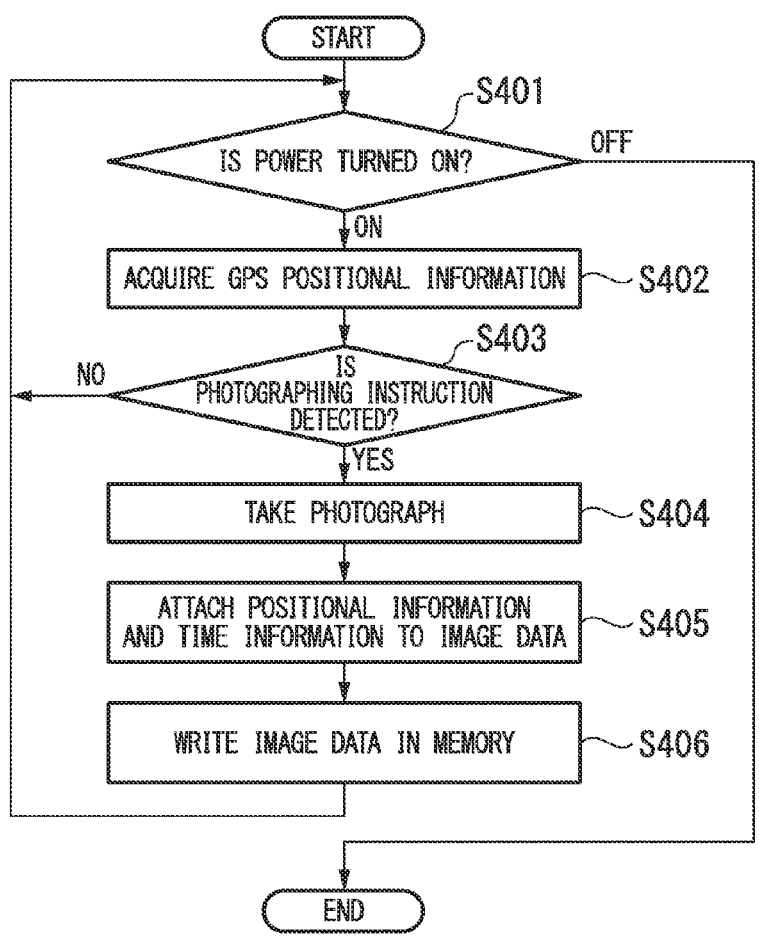
FIG. 4 is a flowchart illustrating a process performed by a digital camera according to a first embodiment of the present invention.

FIG. 4 illustrates a process performed by the digital camera 101. The digital camera 101 has a GPS reception function, and processing of a digital camera with a GPS reception function therein is illustrated here.

After power is turned on, the camera control unit 203 acquires positional information based on information from the GPS unit 204 (steps S401 and S402). When a photographing instruction is detected through the input unit 201 (step S403), the camera control unit 203 causes the imaging unit 202 to take a photograph (step S404). The camera control unit 203 causes positional information and time information (photographing time information) to be attached to the image data output from the imaging unit 202 as exchangeable image file format (EXIF) information (step S405), and writes the image data including the positional information and the time information in the memory card 11 through the host I/F unit 206 (step S406). As long as power remains turned on, the digital camera 101 acquires the positional information, causes the positional information to be attached to the image data at each time photographing is performed, and writes the image data including the positional information in the memory card 11.

Figure 5:
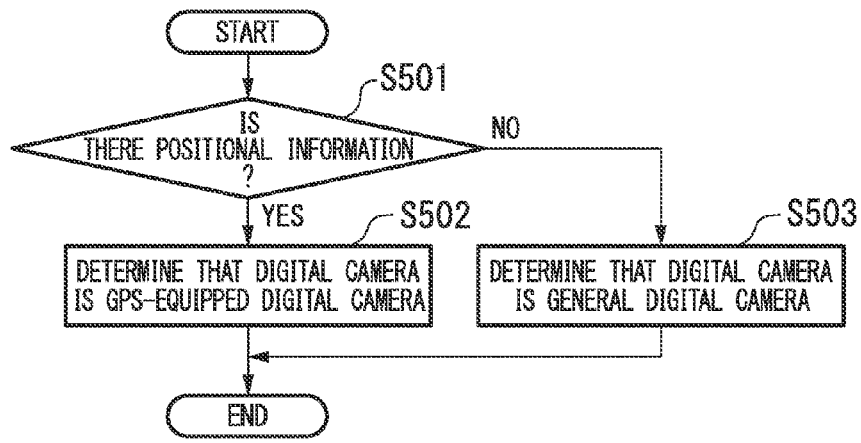
FIG. 5 is a flowchart illustrating a process performed by a memory card according to the first embodiment of the present invention.

FIG. 5 illustrates a process performed by the memory cards 11 and 12. The process illustrated in FIG. 5 is performed when initial photographing is performed after power is turned on, and then image data is stored in the memory cards 11 and 12.

When the image data is input to the memory I/F unit 307 and the input image data is recorded in the memory unit 310, the memory control unit 306 instructs the storage data analyzing unit 303 to perform data analysis. The storage data analyzing unit 303 analyzes the EXIF information of the image data stored in the memory unit 310, and notifies the system control unit 305 of the analysis result. The system control unit 305 determines whether or not the positional information remains attached to the image data based on the analysis result (step S501). When it is determined that the positional information remains attached to the image data, the system control unit 305 determines that the memory cards 11 and 12 remain mounted in a digital camera with a GPS reception function (step S502). Furthermore, when it is determined that the positional information does not remain attached to the image data, the system control unit 305 determines that the memory cards 11 and 12 remain mounted in a general digital camera having no GPS reception function (step S503).

Figure 6:
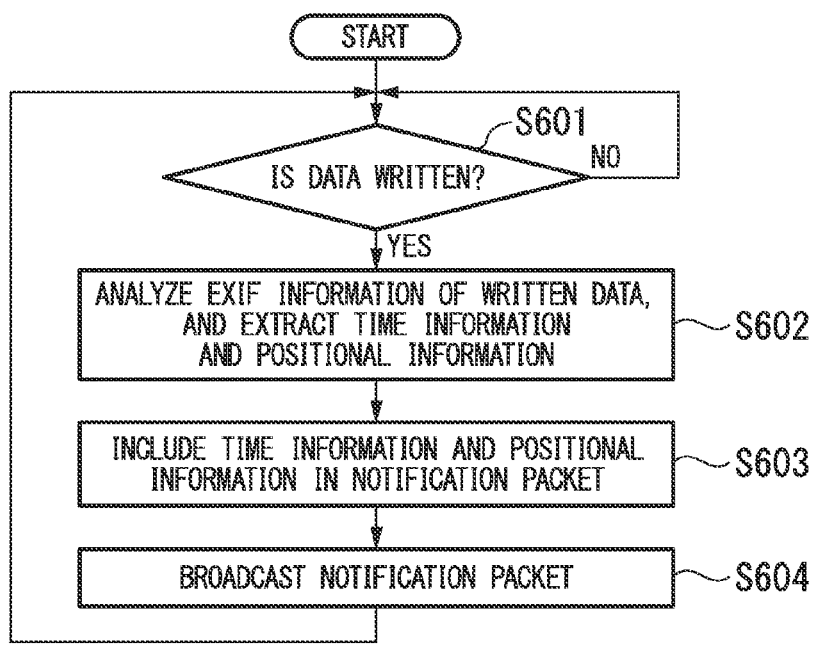
FIG. 6 is a flowchart illustrating a process performed by a memory card according to the first embodiment of the present invention.

FIG. 6 illustrates a process performed by the memory card 11 mounted in the digital camera 101 with the GPS reception function. When the image data is input to the memory I/F unit 307 (step S601), the memory control unit 306 records the input image data in the memory unit 310, and instructs the storage data analyzing unit 303 to perform data analysis. The storage data analyzing unit 303 analyzes the EXIF information of the image data recorded in the memory unit 310, and extracts the time information and the positional information attached to the image data (S602). The extracted time information and the positional information are output to the transmission data generating unit 309 through the system control unit 305. Then, the transmission data generating unit 309 generates a notification packet including the time information and the positional information (step S603). The system control unit 305 performs to broadcast the notification packet through the communication control unit 304 and the RF unit 308 (step S604). After the notification packet is broadcasted, the memory card 11 is on standby for an input of image data.

(Reception Side Process)

Figure 7:
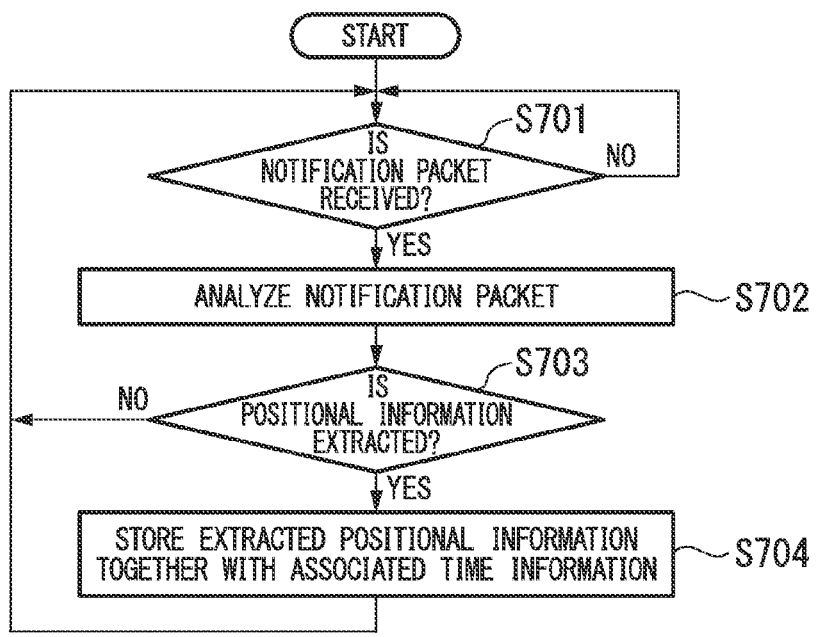
FIG. 7 is a flowchart illustrating a process performed by a memory card according to the first embodiment of the present invention.

FIG. 7 illustrates a process performed by the memory card 12 mounted in the digital camera 102 having no GPS reception function. First of all, the system control unit 305 determines whether or not a notification packet has been received from another memory card 11 (step S701). When the notification packet has been received, the reception data analyzing unit 302 analyzes information included in the notification packet, extracts the positional information and the time information (the photographing time of the digital camera 101) associated with the positional information, and notifies the system control unit 305 of the extraction result (step S702). When the positional information is included in the notification packet, and the positional information is possible to be extracted (step S703), the system control unit 305 causes the positional information and the time information to be stored in the DB unit 311 through the memory control unit 306 (step S704). After the positional information and the time information are stored, the memory card 12 is on standby for reception of the notification packet.

Figure 8:
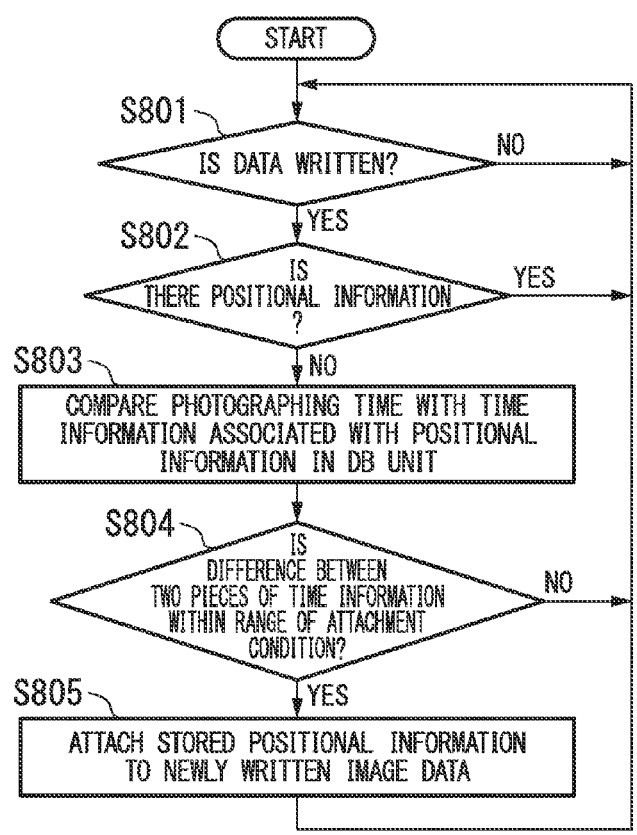
FIG. 8 is a flowchart illustrating a process performed by a memory card according to the first embodiment of the present invention.

FIG. 8 illustrates a process performed by the memory card 12 when the digital camera 102 takes a photograph and writes image data in the memory card 12. The process illustrated in FIG. 8 is performed in parallel with the process illustrated in FIG. 7.

When the image data is input to the memory I/F unit 307 (step S801), the memory control unit 306 records the input image data in the memory unit 310, and instructs the storage data analyzing unit 303 to perform data analysis. The storage data analyzing unit 303 analyzes the EXIF information of the image data recorded in the memory unit 310, and determines whether or not the positional information remains attached to the image data (step S802). When it is determined that the positional information remains attached to the image data, processing performed on the image data ends, and the memory card 11 is on standby for an input of image data.

When it is determined that the positional information does not remain attached to the image data, the storage data analyzing unit 303 extracts the time information attached to the image data, and outputs the extracted time information to the determining unit 301. Further, the system control unit 305 reads the time information associated with the positional information and information of a condition for attaching the positional information to the image data from the DB unit 311 through the memory control unit 306, and outputs the read information to the determining unit 301. The determining unit 301 compares the time information extracted from the image data with the time information read from the DB unit 311

(step S803). The determining unit 301 determines whether or not the difference between the two pieces of time information is within the range of the condition for attaching the positional information to the image data based on the comparison result, and notifies the system control unit 305 of the determination result (step S804).

When it is determined that the difference between the two pieces of time information is not within the range of the attachment condition, processing performed on the image data ends, and the memory card 11 is on standby for an input of image data. However, when it is determined that the difference between the two pieces of time information is within the range of the attachment condition, the system control unit 305 attaches the positional information associated with the time information read from the DB unit 311 to the EXIF information of the image data recorded in the memory unit 310 through the memory control unit 306 (step S805). Then, the memory card 11 is on standby for an input of image data.

Figure 9:
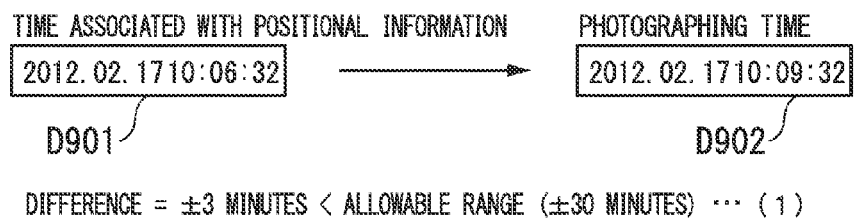
FIG. 9 is a reference diagram illustrating a condition for attaching positional information to image data according to the first embodiment of the present invention.

The condition for attaching the positional information to the image data refers to an allowable range of a time difference for attaching the positional information. For example, as illustrated in FIG. 9, when the time information stored in the DB unit 311 represents a time D901, and the time information attached to the image data written in the memory unit 310 represents a time D902, the difference between the two times is 3 minutes. When the allowable range for attaching the positional information is set to ±30 minutes, the time difference is within the allowable range, and thus the positional information stored in the DB unit 311 is attached to the image data written in the memory unit 310.

Figure 10:
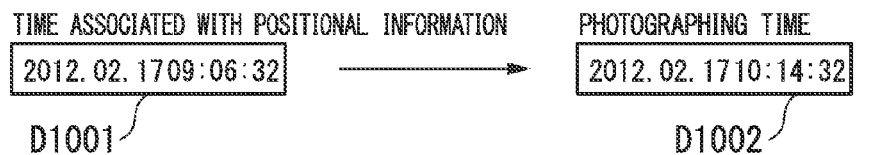
FIG. 10 is a reference diagram illustrating a condition for attaching positional information to image data according to the first embodiment of the present invention.

Further, as illustrated in FIG. 10, when the difference between a time D1001 represented by the time information stored in the DB unit 311 and a time D1002 represented by the time information attached to the image data written in the memory unit 310 is one hour and 8 minutes, since the difference between the two times does not fall within the allowable range, that is, ±30 minutes, the positional information is not attached to the image data. The information of the allowable range (±30 minutes) is recorded in the DB unit 311 at the time of shipping from the factory. However, a setting at the time of shipping from the factory does not limit that the memory cards 11 and 12 are connected to an external device such as a personal computer, and a setting value of a memory card is changed on the external device using an application capable of changing the setting value.

(Pattern of Acquiring Positional Information from Plurality of Counterparts)

Figure 11:
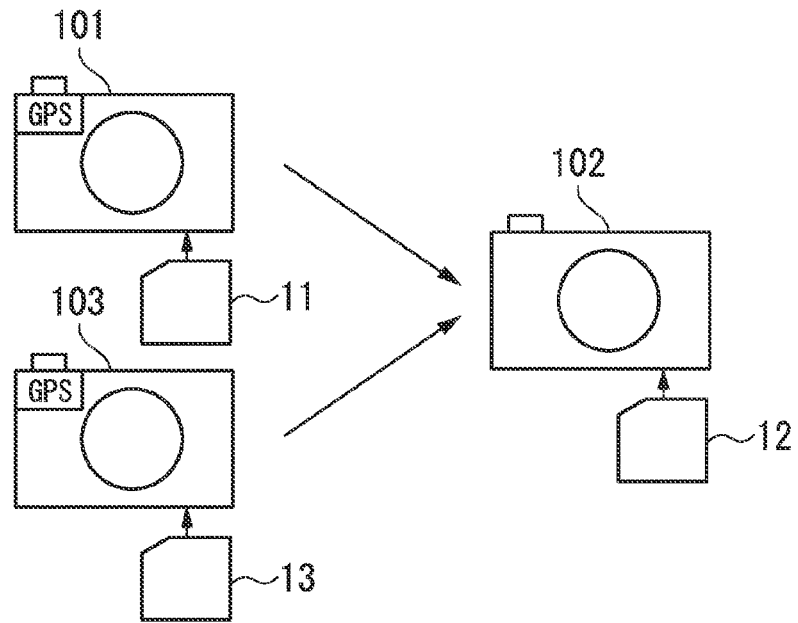
FIG. 11 is a reference diagram illustrating a form of sharing positional information according to the first embodiment of the present invention.

An example in which positional information is acquired from a plurality of devices will be described with reference to FIG. 11. Referring to FIG. 11, a digital camera 103 having a GPS reception function and a memory card 13 mounted in the digital camera 103 are added. As described with reference to FIG. 6, the memory cards 11 and 13 broadcast the notification packet including the positional information at each time the image data is written, and the memory card 12 receives the corresponding notification packet. In the example illustrated in FIG. 11, the memory card 12 updates the information of the DB unit 311 at each time the notification packets are received from the plurality of memory cards 11 and 13.

(Pattern of Sharing Positional Information with Plurality of Counterparts)

Figure 12:
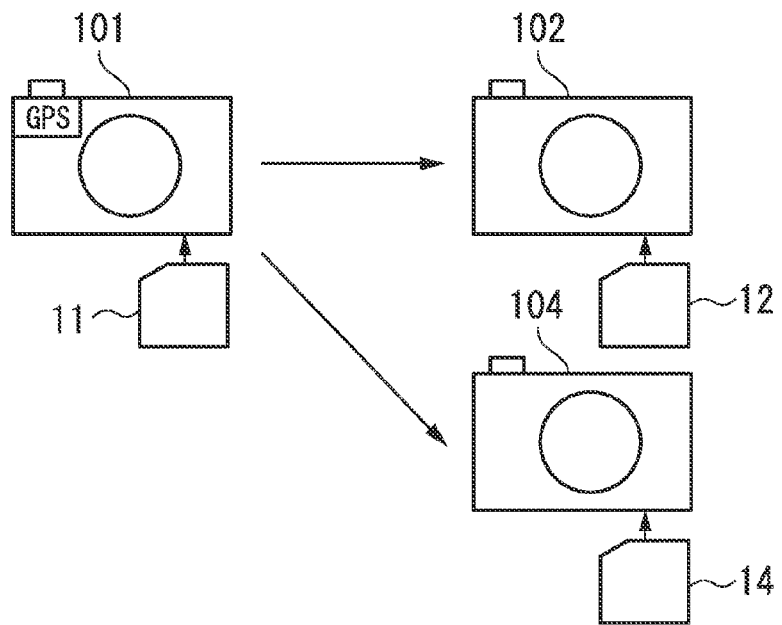
FIG. 12 is a reference diagram illustrating a form of sharing positional information according to the first embodiment of the present invention.

An example in which a plurality of devices acquire the positional information from a single device will be described with reference to FIG. 12. Referring to FIG. 12, a digital camera 104 having a GPS reception function and a memory card 14 mounted in the digital camera 104 are added. As described with reference to FIG. 6, since the memory card 11 broadcasts the notification packet, the memory cards 12 and 14 are possible to similarly receive the corresponding notification packet, execute the process illustrated in FIGS. 7 and 8, and attach the positional information to the image data.

(Limitation of Communication Range)

For example, when a wireless LAN is used, a general wireless device is possible to mostly perform communication within a radius of about 30 m. In the present embodiment, this means that the positional information is shared within a radius of about 30 m, and an error of a maximum of 30 m occurs. Thus, the communication range is reduced only when the positional information is shared, and thus the accuracy of the positional information to be shared is possible to be further increased. This method will be described with reference to FIG. 13.

Figure 13:
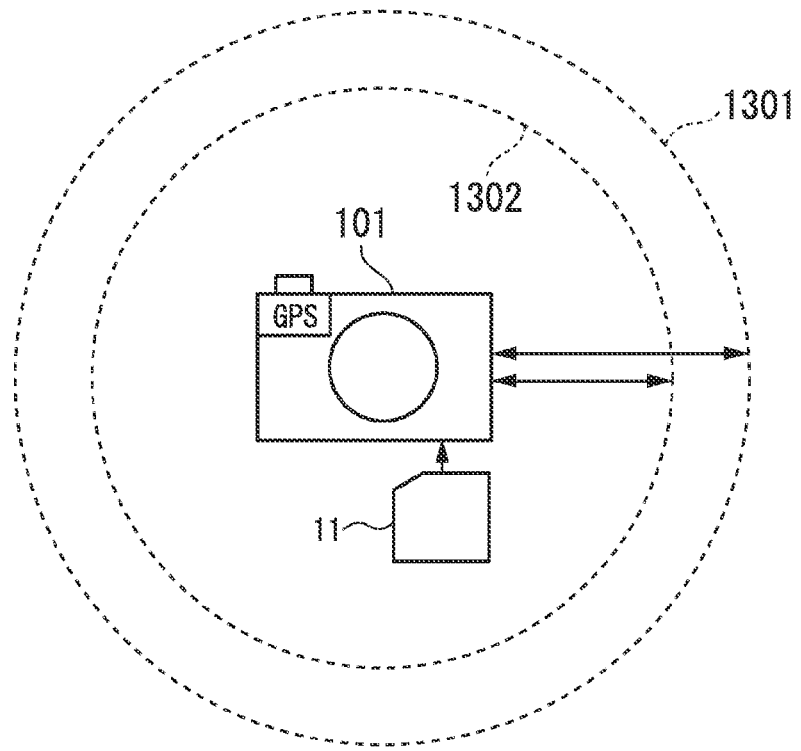
FIG. 13 is a reference diagram illustrating a form of limiting a range in which positional information is shared according to the first embodiment of the present invention.

FIG. 13 illustrates the communication range of the memory card 11 mounted in the digital camera 101. Since there is no directivity in the wireless communication, the communication range has a form in which a circle is drawn with its center on the digital camera 101 and the memory card 11. When a communication mode is a normal communication mode, for example, communication coverage 1301 is the communication range. Further, when communication for sharing the positional information is performed, the system control unit 305 of the memory card 11 reduces a wireless output (a signal output level) of the RF unit 308 through the communication control unit 304. As a result, the notification packet including the positional information is transmitted to a device positioned within communication coverage 1302, which is narrower than the communication coverage 1301.

Figure 14:
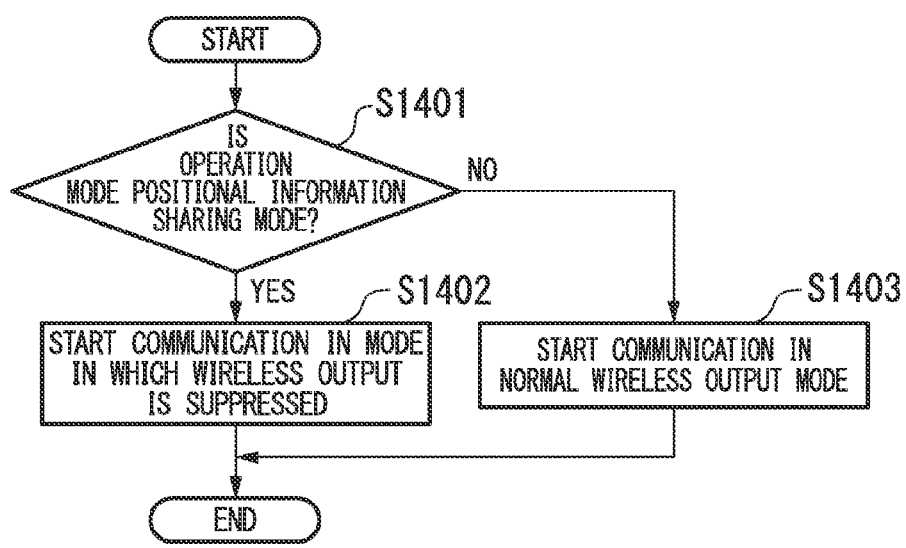
FIG. 14 is a flowchart illustrating a process performed by a memory card according to the first embodiment of the present invention.
Figure 15:
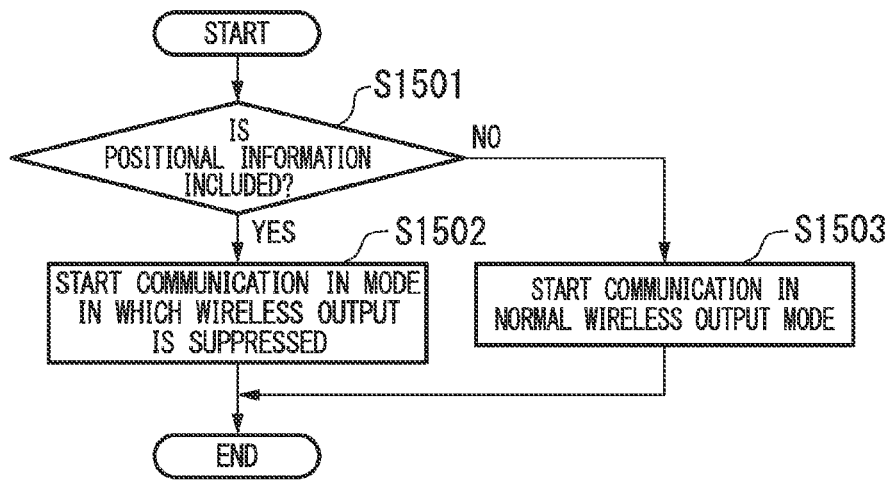
FIG. 15 is a flowchart illustrating a process performed by a memory card according to the first embodiment of the present invention.

FIGS. 14 and 15 illustrate a transmission output control method. The process illustrated in FIGS. 14 and 15 is performed when the image data is input to the memory I/F unit 307 of the memory card 11 and the image data is written in the memory unit 310. FIG. 14 illustrates a process performed by the memory card 11 when the memory card 11 is set to a positional information sharing mode in advance using an external application or the like. The system control unit 305 checks a positional information sharing mode flag stored in the DB unit 311, performs switching to a mode in which the wireless output is suppressed by the communication control unit 304 when the operation mode is the positional information sharing mode, and then starts communication (steps S1401 and S1402). However, when the operation mode is not the positional information sharing mode, the system control unit 305 sets the wireless output to the normal mode, and then starts communication (steps S1401 and S1403).

FIG. 15 illustrates a process performed by the memory card 11 by another method. When the positional information is included in the image data written in the memory unit 310, the system control unit 305 starts communication in the mode in which the wireless output is suppressed by the communication control unit 304 (steps S1501 and S1502). However, when the positional information is not included in the data written in the memory unit 310, the system control unit 305 sets the wireless output to the normal mode, and then starts communication (steps S1501 and S1503).

As described above, according to the present embodiment, in the memory card 11, the image data including the positional information is input from the digital camera 101. When the image data is stored in the memory unit 310, the positional information is extracted from the image data and wirelessly transmitted to another memory card. Further, in the memory card 12, the image data is input from the digital camera 102. When the image data is stored in the memory unit 310, any positional information which is wirelessly received from the memory card 11 and stored in the DB unit 311 is attached to the image data. Thus, it is possible to attach the positional information to the image data taken by the digital camera 102 without changing the hardware configuration of the digital camera 102 having no wireless communication function. Further, even though the memory card 12 neither searches the memory card 11 nor requests the positional information, the memory card 11 broadcasts the positional information. Thus, the memory card 12 is possible to acquire the positional information and thus easily perform processing related to acquisition of the positional information.

Further, the memory card 11 extracts the time information attached to the image data and wirelessly transmits the time information together with the positional information, and thus the memory card at the reception side is possible to be notified a time and a place at which photographing is performed. Furthermore, the memory card 12 stores the time information and the positional information received from the memory card 11 in the DB unit 311, and when the image data is stored in the memory unit 310, the memory card 12 selects any positional information stored in the DB unit 311 based on the time information attached to the image data and the time information stored in the DB unit 311 and attaches the positional information to the image data. Thus, the positional information most appropriate for the photographing time is possible to be attached to the image data.

In addition, when the memory card 11 wirelessly transmits the positional information, the wireless output is suppressed, and thus the range in which the positional information is shared is possible to be narrowed, and the accuracy of the positional information attached to the image data is possible to be improved.

(Second Embodiment)

Next, a second embodiment of the present invention will be described. The second embodiment will be described in connection with a method of acquiring the positional information when the memory card 12 mounted in the digital camera 102 having no GPS reception function requests the memory card 11 to transmit the GPS positional information.

(Transmission Side Process)

Figure 16:
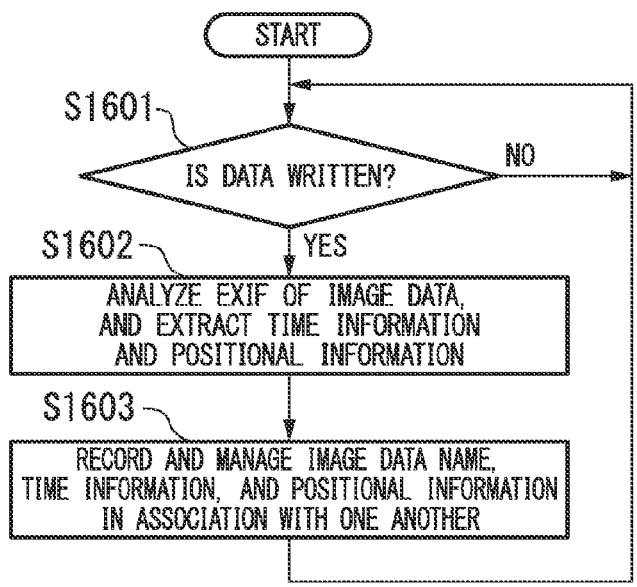
FIG. 16 is a flowchart illustrating a process performed by a memory card according to a second embodiment of the present invention.

FIG. 16 illustrates a process performed by the memory card 11 mounted in the digital camera 101 with the GPS reception function. When image data is input to the memory I/F unit 307 (step S1601), the memory control unit 306 records the input image data in the memory unit 310, and instructs the storage data analyzing unit 303 to perform data analysis. The storage data analyzing unit 303 analyzes the EXIF information of the image data recorded in the memory unit 310, and extracts the time information and the positional information attached to the image data (step S1602). The system control unit 305 is notified of the extracted time information and the extracted positional information. The system control unit 305 stores the time information and the positional information in the DB unit 311 in association with a file name of the image data through the memory control unit 306 (step S1603).

Figure 17:
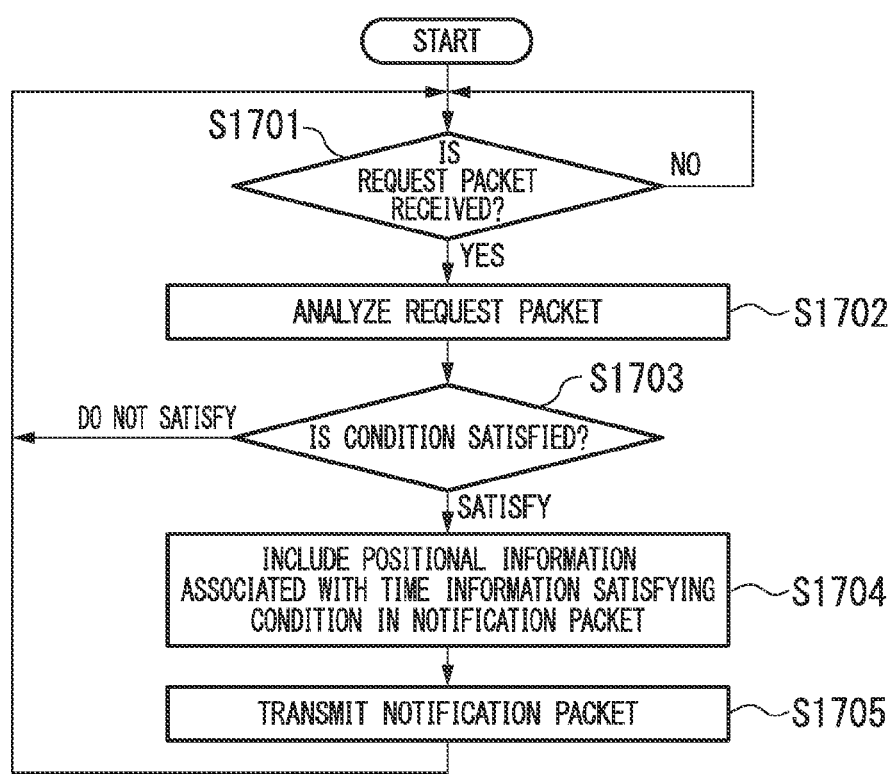
FIG. 17 is a flowchart illustrating a process performed by a memory card according to the second embodiment of the present invention.

The process illustrated in FIG. 17 is performed in parallel with a process illustrated in FIG. 16. FIG. 17 illustrates a process in which the memory card 11 notifies of the positional information according to request from the memory card 12. First of all, the system control unit 305 determines whether or not a request packet for requesting acquisition of the positional information has been received from another memory card (step S1701). When it is determined that the request packet has been received, the reception data analyzing unit 302 analyzes information included in the request packet, extracts the time information, and notifies the system control unit 305 of the extraction result (step S1702). The system control unit 305 reads a combination of the time information and the positional information from the DB unit 311 through the memory control unit 306, compares the time information extracted from the request packet with the time information read from the DB unit 311, and determines whether or not the condition is satisfied (step S1703).

When there is no time information satisfying the condition among time information read from the DB unit 311, the processing performed on the received request packet ends, and the memory card 11 is on standby for an input of the request packet. Further, when there is time information satisfying the condition among time information read from the DB unit 311, the system control unit 305 outputs one or more pieces of time information satisfying the condition to the transmission data generating unit 309. The condition is assumed to be satisfied when the difference between the time information extracted from the request packet and the time information read from the DB unit 311 is within a predetermined period of time. A method of determining the time information satisfying the condition is similar to the content illustrated in FIGS. 9 and 10. Further, the system control unit 305 reads the positional information associated with the time information satisfying the condition from the DB unit 311 through the memory control unit 306, and outputs the read positional information to the transmission data generating unit 309.

Next, the transmission data generating unit 309 generates a notification packet including the positional information (step S1704). The system control unit 305 wirelessly transmits the notification packet to the memory card 12 of the transmission destination of the request packet through the communication control unit 304 and the RF unit 308 (step S1705). After the notification packet is transmitted, the memory card 11 is on standby for an input of image data.

(Reception Side Process)

Figure 18:
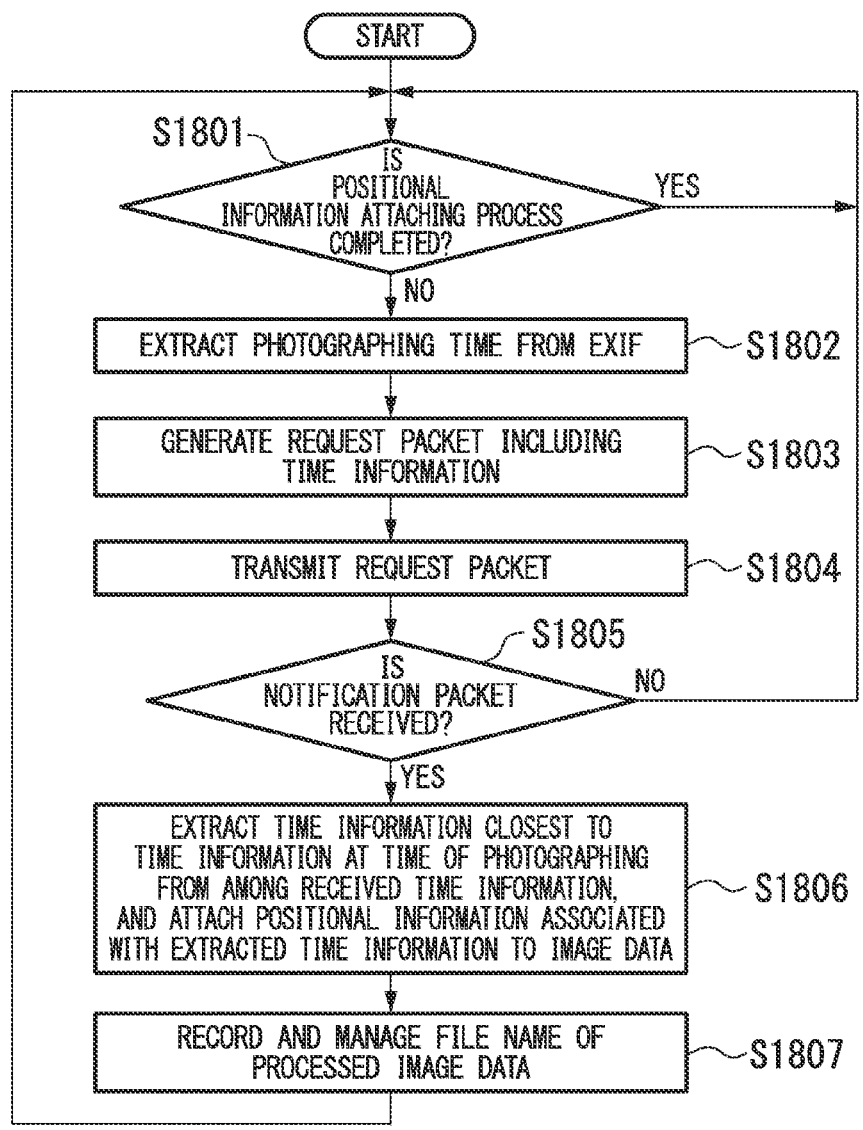
FIG. 18 is a flowchart illustrating a process performed by a memory card according to the second embodiment of the present invention.
Figure 19:
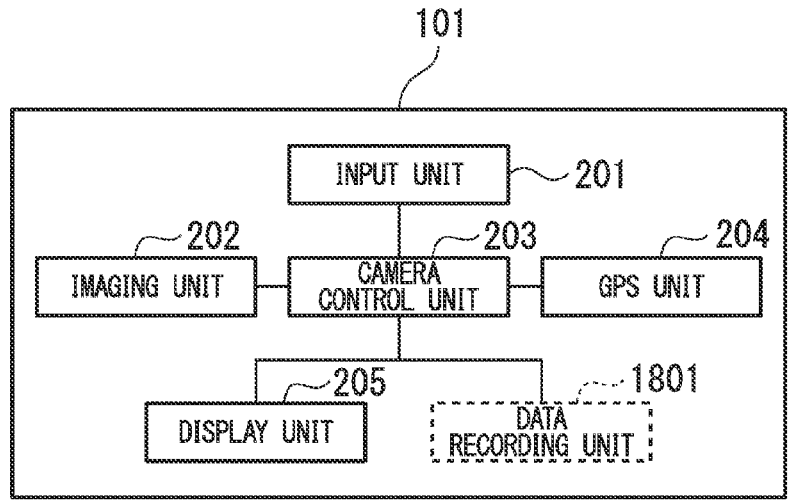
FIG. 19 is a block diagram illustrating a configuration of a digital camera according to a modified example of the present invention.

In the memory card 12 mounted in the digital camera 102 having no GPS reception function, a process illustrated in FIGS. 18 and 19 is performed independently of the process in which a photograph is taken by the digital camera 102, and image data is written in the memory card 12. FIG. 18 illustrates a process in which the memory card 12 requests the memory card 11 to transmit the positional information. The DB unit 311 stores management information in which a file name of image data including the positional information and stored in the memory unit 310 is associated with a flag representing whether or not processing of attaching positional information to image data has been performed. First of all, the system control unit 305 reads the management information through the memory control unit 306, and determines whether or not the processing of attaching positional information has been performed on all image data (step S1801).

When it is determined that the processing of attaching positional information has been performed on all of the image data, the process returns to step S1801. However, when there is image data on which the processing of attaching positional information has not been performed, the storage data analyzing unit 303 analyzes the EXIF information of the corresponding image data, which is stored in the memory unit 310, and extracts the time information attached to the image data (step S1802). The extracted time information is output to the transmission data generating unit 309 through the system control unit 305.

The transmission data generating unit 309 generates a request packet including the time information (step S1803). The system control unit 305 wirelessly transmits the request packet to the memory card 11 through the communication control unit 304 and the RF unit 308 (step S1804). Next, the system control unit 305 determines whether or not the notification packet has been received within a predetermined period of time after the request packet is transmitted (step S1805).

When it is determined that the notification packet has not been received within the predetermined period of time, the process returns to step S1801. However, when it is determined that the notification packet has been received within the predetermined period of time, the reception data analyzing unit 302 analyzes information included in the notification packet, extracts time information, and outputs the extracted time information to the system control unit 305. The system control unit 305 compares the time information extracted from the notification packet with the time information extracted in step S1802. The system control unit 305 selects time information closest to the time information extracted in step S1802 from among time information extracted from the notification packet, and reads positional information associated with the selected time information from the DB unit 311 through the memory control unit 306. Further, the system control unit 305 attaches the positional information to the EXIF information of the image data recorded in the memory unit 310 through the memory control unit 306 (step S1806).

Then, the system control unit 305 updates the flag included in the management information of the image data including the positional information to "processed" through the memory control unit 306 (step S1807). Then, the process returns to step S1801.

As described above, according to the present embodiment, when the memory card 12 requests the memory card 11 to transmit the positional information, the positional information is wirelessly transmitted from the memory card 11 to the memory card 12. In the memory card 12, the wirelessly received positional information is attached to the image data. Thus, it is possible to attach the positional information to the image data taken by the digital camera 102 without changing the hardware configuration of the digital camera 102 having no wireless communication function. Further, the memory card 12 is possible to actively acquire the positional information.

Further, the time information attached to the image data serving as a target to which the positional information is attached is included in the acquisition request transmitted from the memory card 12 to the memory card 11. In the memory card 11, the positional information associated with the time information close to the time information included in the acquisition request among pieces of positional information stored in the DB unit 311 is wirelessly transmitted to the memory card 12. Furthermore, in the memory card 12, the wirelessly received positional information is attached to the image data. Thus, the memory card 12 is possible to acquire the positional information which is likely to be the same as that of its own current position.

The memory cards 11 and 12 may have both the function of the first embodiment and the function of the second embodiment. In this case, the memory card 11 performs the processes illustrated in FIGS. 6, 16, and 17 at the same time, and the memory card 12 performs the processes illustrated in FIGS. 7, 8, and 18 at the same time. Thus, for example, when the digital camera 102 takes a photograph and image data is recorded in the memory card 12, the time information satisfying the condition is not stored in the DB unit 311. Even though it is difficult to attach the positional information to the image data in the process of FIG. 8, it is possible to acquire the positional information from the memory card 11 and attach the positional information to the image data through the process of FIG. 18. Further, the memory card 12 receives the notification packet broadcast from the memory card 11 in step S701 of FIG. 7. Thus, since the memory card 11 is recognized, in step S1804 of FIG. 18, it is possible to transmit the request packet to the memory card 11 without searching for another memory card.

(Another System Configuration)

Figure 20:
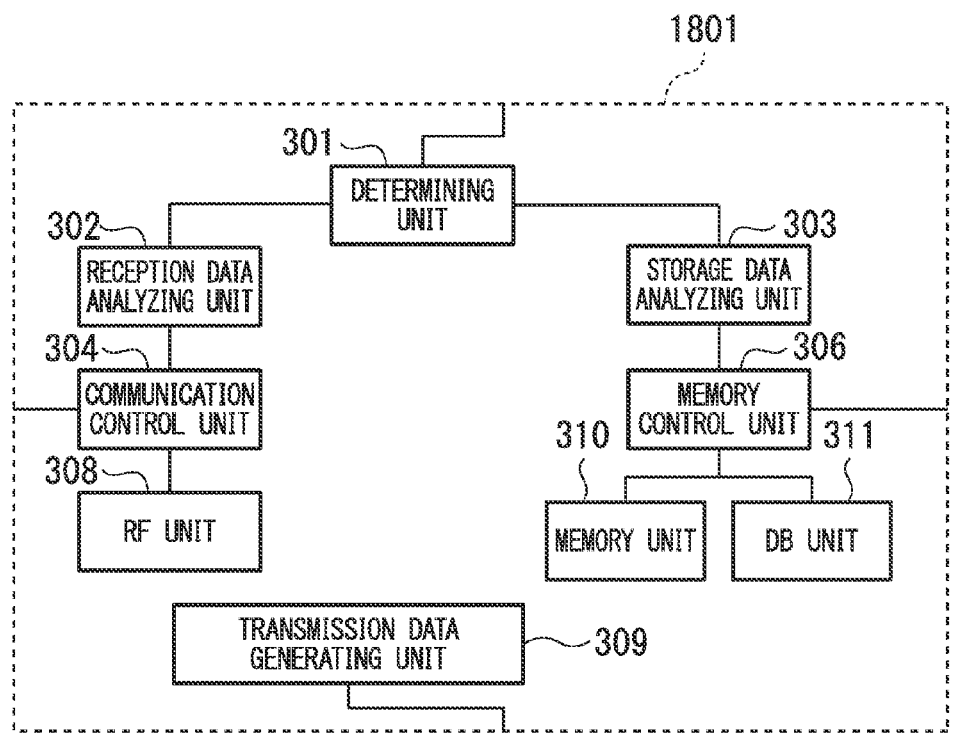
FIG. 20 is a block diagram illustrating a configuration of a data recording unit of the digital camera according to the modified example of the present invention.

The above embodiments have been described in connection with the example of the memory card, but the digital camera may have the function for sharing the positional information. FIGS. 19 and 20 illustrate a configuration of the digital camera 101 having the functions of the memory cards 11 and 12. The digital camera 101 has the same configuration as the digital camera 102, and thus the description will proceed with the configuration of the digital camera 101 as a representative example.

The digital camera 101 includes a data recording unit 1801 instead of the host I/F unit 206 of FIG. 2. The data recording unit 1801 includes a determining unit 301, a reception data analyzing unit 302, a storage data analyzing unit 303, a communication control unit 304, a memory control unit 306, an RF unit 308, a transmission data generating unit 309, a memory unit 310, and a DB unit 311. In FIG. 20, the determining unit 301, the communication control unit 304, the memory control unit 306, and the transmission data generating unit 309 are connected with the camera control unit 203. Further, the camera control unit 203 has the function of the system control unit 305 of FIG. 3.

The embodiments of the invention causes the digital camera including a wireless communication module (corresponding to the communication control unit 304 and the RF unit 308) and a memory module (corresponding to the memory control unit 306 and the memory unit 310) to read and execute a program for implementing the same function as in the memory cards 11 and 12. Thus, it is possible to configure the digital camera including the data recording unit 1801 without changing the hardware configuration of the digital camera.

The embodiments of the invention have been described in detail above with reference to the accompanying drawings, but the concrete configuration is not limited to the above embodiment, and a design change of a range not departing from the gist of the invention is also included.

What is claimed is:

1. A wireless communication device, comprising:
a wired interface that receives image data to which positional information is attached from another device;
a wireless communication interface;
a storage unit that stores the image data input to the wired interface;
a control unit that extracts the positional information from the image data when the image data is stored in the storage unit, and causes the extracted positional information to be wirelessly transmitted from the wireless communication interface to another wireless communication device; and
wherein time information is further attached to the image data, and
the control unit extracts the positional information and the time information from the image data when the image data is stored in the storage unit, and causes the extracted positional information and the time information to be wirelessly transmitted from the wireless communication interface.

2. The wireless communication device according to claim 1,
wherein the control unit suppresses a signal output level of the wireless communication interface when the positional information is wirelessly transmitted from the wireless communication interface.

3. The wireless communication device according to claim 1,
wherein the control unit further causes the positional information to be wirelessly transmitted from the wireless communication interface when the wireless communication interface receives a positional information acquisition request wirelessly transmitted from another wireless communication device.

4. The wireless communication device according to claim 1,
when the wireless communication interface receives a positional information acquisition request including the time information, wirelessly transmitted from another wireless communication device, the control unit further selects the image data based on the received time information and the time information attached to the image data stored in the storage unit, and causes the positional information attached to the selected image data to be wirelessly transmitted from the wireless communication interface.

5. A wireless communication device, comprising:
a wired interface that receives image data from another device;
a wireless communication interface that wirelessly receives positional information from another wireless communication device that extracts the positional information from image data to which the positional information is attached and wirelessly transmits the extracted positional information, when the image data to which the positional information is attached is stored;
a storage unit that stores the positional information received by the wireless communication interface and the image data input to the wired interface; and
a control unit that attaches any positional information stored in the storage unit to the image data stored in the storage unit when the image data is stored in the storage unit.

6. The wireless communication device according to claim 5,
wherein, when image data to which positional information and time information are attached is stored, the wireless communication interface wirelessly receives the positional information and the time information from another wireless communication device that extracts the positional information and the time information from the image data to which the positional information and the time information are attached and wirelessly transmits the extracted positional information and the time information,
the storage unit further stores the time information received by the wireless communication interface, and
when the image data input to the wired interface is stored in the storage unit, the control unit selects one of positional information stored in the storage unit based on the time information attached to the image data stored in the storage unit and the time information received by the wireless communication interface and stored in the storage unit, and attaches the selected positional information to the image data stored in the storage unit.

7. The wireless communication device according to claim 5,
wherein the control unit further causes a positional information acquisition request to be wirelessly transmitted from the wireless communication interface to the other wireless communication device,
after wirelessly transmitting the acquisition request, the wireless communication interface further wirelessly receives the positional information wirelessly transmitted from the other wireless communication device that has wirelessly received the acquisition request, and
when the positional information is wirelessly received, the control unit further attaches the wirelessly received positional information to the image data stored in the storage unit.

8. The wireless communication device according to claim 7,
wherein time information is attached to the image data stored in the storage unit, and
when the positional information acquisition request is wirelessly transmitted from the wireless communication interface, the control unit causes the time information attached to the image data stored in the storage unit to be wirelessly transmitted to the other wireless communication device.

9. A memory device, comprising:
the wireless communication device according to claim 1.

10. A memory device, comprising:
the wireless communication device according to claim 5.

11. A wireless communication system, comprising:
a first wireless communication device; and
a second wireless communication device,
wherein the first wireless communication device includes
a first wired interface that receives image data to which positional information is attached from another device,
a first wireless communication interface,
a first storage unit that stores the image data input to the first wired interface, and
a first control unit that extracts the positional information from the image data when the image data is stored in the first storage unit, and causes the extracted positional information to be wirelessly transmitted from the first wireless communication interface to the second wireless communication device, and
wherein the second wireless communication device includes
a second wired interface that receives image data from another device,
a second wireless communication interface that wirelessly receives the positional information from the first wireless communication device,
a second storage unit that stores the positional information received by the second wireless communication interface and the image data input to the second wired interface, and
a second control unit that attaches one of positional information stored in the second storage unit to the image data stored in the second storage unit when the image data input to the second wired interface is stored in the second storage unit.

12. A wireless communication method, comprising:
inputting image data to which positional information and time information are attached from another device to a wired interface;
storing the image data input to the wired interface in a storage unit; and
extracting the positional information and the time information from the image data when the image data is stored in the storage unit to cause the extracted positional information and the extracted time information to be wirelessly transmitted from the wireless communication interface to another wireless communication device.

13. A wireless communication method, comprising:
inputting image data from another device to a wired interface;

wirelessly receiving positional information through a wireless communication interface from another wireless communication device that extracts the positional information from the image data when the image data to which the positional information is attached is stored and wirelessly transmits the extracted positional information;

storing the positional information received by the wireless communication interface and the image data input to the wired interface in a storage unit; and attaching one of positional information stored in the storage unit to the image data stored in the storage unit when the image data is stored in the storage unit.

14. A non-transitory program recordable medium recording a program causing a computer of a wireless communication device including a wired interface, a wireless communication interface, and a storage unit to execute:

inputting image data to which positional information and time information are attached from another device to the wired interface;

storing the image data input to the wired interface in the storage unit; and extracting the positional information and the time information from the image data when the image data is stored in the storage unit to cause the extracted positional information and the extracted time information to be wirelessly transmitted from the wireless communication interface to another wireless communication device.

15. A non-transitory program recordable medium recording a program causing a computer of a wireless communication device including a wired interface, a wireless communication interface, and a storage unit to execute:

inputting image data from another device to the wired interface;

wirelessly receiving positional information through the wireless communication interface from another wireless communication device that extracts the positional information from the image data when the image data to which the positional information is attached is stored and wirelessly transmits the extracted positional information storing the positional information received by the wireless communication interface and the image data input to the wired interface in the storage unit; and attaching one of positional information stored in the storage unit to the image data stored in the storage unit when the image data is stored in the storage unit.

* * * * *